US012297676B2

(12) United States Patent
Mitsuhashi

(10) Patent No.: US 12,297,676 B2
(45) Date of Patent: May 13, 2025

(54) CYLINDER LOCK

(71) Applicant: LIXIL Corporation, Tokyo (JP)

(72) Inventor: Takashi Mitsuhashi, Tokyo (JP)

(73) Assignee: LIXIL Corporation, Tokyo (JP)

( * ) Notice: Subject to any disclaimer, the term of this patent is extended or adjusted under 35 U.S.C. 154(b) by 162 days.

(21) Appl. No.: 17/927,123

(22) PCT Filed: Mar. 29, 2021

(86) PCT No.: PCT/JP2021/013291
§ 371 (c)(1),
(2) Date: Nov. 22, 2022

(87) PCT Pub. No.: WO2021/240984
PCT Pub. Date: Dec. 2, 2021

(65) Prior Publication Data
US 2023/0184006 A1 Jun. 15, 2023

(30) Foreign Application Priority Data
May 25, 2020 (JP) ................................ 2020-090608

(51) Int. Cl.
*E05B 9/04* (2006.01)
*E05B 17/14* (2006.01)
(Continued)

(52) U.S. Cl.
CPC .............. *E05B 9/045* (2013.01); *E05B 27/08* (2013.01); *E05B 63/08* (2013.01); *E05B 17/142* (2013.01)

(58) Field of Classification Search
CPC . E05B 9/00; E05B 9/002; E05B 9/045; E05B 17/00; E05B 17/14; E05B 17/142;
(Continued)

(56) References Cited

U.S. PATENT DOCUMENTS 3,928,993 A * 12/1975 Epstein .................. E05B 27/00 70/495
2004/0129044 A1* 7/2004 DiVito ................ E05B 47/0634 70/278.3

(Continued)

FOREIGN PATENT DOCUMENTS

JP H6-74684 B2 9/1994
JP H10-311170 A 11/1998
JP 2007-211413 A 8/2007

*Primary Examiner* — Nathan Cumar
(74) *Attorney, Agent, or Firm* — Morrison & Foerster LLP

(57) ABSTRACT

This cylinder lock is a cylinder lock which can lock and unlock a mortise lock via a displacement transmission member. The cylinder lock comprises: a cylinder lock body; a key insertion part which is provided on one end side of the cylinder lock body and into which a key is inserted; and a displacement transmission member mounting part which is provided on the other end side of the cylinder lock body and on which the displacement transmission member can be mounted. A plurality of displacement transmission members corresponding to each of case locks having a plurality of specifications can be removably mounted on the displacement transmission member mounting part. Thus, cylinder locks having the same specification can be applied to case locks having a variety of specifications.

7 Claims, 13 Drawing Sheets

(51) Int. Cl.
*E05B 27/08* (2006.01)
*E05B 63/08* (2006.01)

(58) Field of Classification Search
CPC ........ E05B 17/145; E05B 27/00; E05B 27/02; E05B 27/08; E05B 27/083; E05B 27/086; E05B 63/00; E05B 63/08; E05B 63/10
USPC .............................................................. 70/395
See application file for complete search history.

(56) References Cited

U.S. PATENT DOCUMENTS

| | | | | |
|---|---|---|---|---|
| 2005/0050930 | A1* | 3/2005 | Yang | E05B 3/003<br>70/493 |
| 2019/0136575 | A1* | 5/2019 | Barker | E05B 1/0015 |
| 2019/0136581 | A1* | 5/2019 | Barker | E05B 1/0015 |

* cited by examiner

CYLINDER LOCK

CROSS REFERENCE TO RELATED APPLICATIONS

This application is a national stage application under 35 U.S.C. 371 of International Application No. PCT/JP2021/013291, filed Mar. 29, 2021, which claims the priority of Japanese Application No. 2020-090608, filed May 25, 2020, the entire contents of each priority application of which is incorporated herein by reference.

FIELD OF THE DISCLOSURE

The present disclosure relates to a cylinder lock.

BACKGROUND OF THE DISCLOSURE

Generally, a cylinder lock is applicable to a mortise lock that is disposed inside, for example, a door end, and the specifications of the cylinder lock and the specifications of the mortise lock are in a one-to-one correspondence relationship. On the other hand, there has been proposed a cylinder lock replacement device that enables replacement of only the cylinder lock originally applied to a temporary or existing mortise lock with another cylinder lock of a different mounting type (for example, see Patent Document 1). According to the device of Patent Document 1, the mortise lock is provided with a structure including a replacement assembly having an annular adapter, and another cylinder lock that is different in specifications from the original cylinder lock is adapted to the existing mortise lock.

Patent Document 1: Japanese Unexamined Patent Application, Publication No. H10-311170

SUMMARY OF THE DISCLOSURE

The mortise lock having the replacement assembly disclosed in Patent Document 1 is convenient in a case where cylinder locks that are different in specifications from the original cylinder locks are to be applied to mortise locks that are identical in specifications. However, the technique of Patent Document 1 is unable to address a reverse case, i.e., a case where cylinder locks that are identical in specifications are to be applied to mortise locks of various specifications.

The present disclosure has been achieved in view of the circumstances described above, and it is an object of the present disclosure to provide cylinder locks that are identical in specifications and applicable to mortise locks of various specifications.

A cylinder lock capable of locking and unlocking a mortise lock via a displacement transmission member is provided. The cylinder lock includes: a cylinder lock body; a key insertion portion that is disposed at one end of the cylinder lock body and allows a key to be inserted therethrough, and a displacement transmission member mounting portion that is disposed at another end of the cylinder lock body and is provided for allowing mounting of the displacement transmission member. The displacement transmission member mounting portion allows each of a plurality of displacement transmission members to be detachably mounted thereon, the plurality of displacement transmission members respectively corresponding to mortise locks having a plurality of types of specifications.

DETAILED DESCRIPTION OF THE DISCLOSURE

Figure 1:
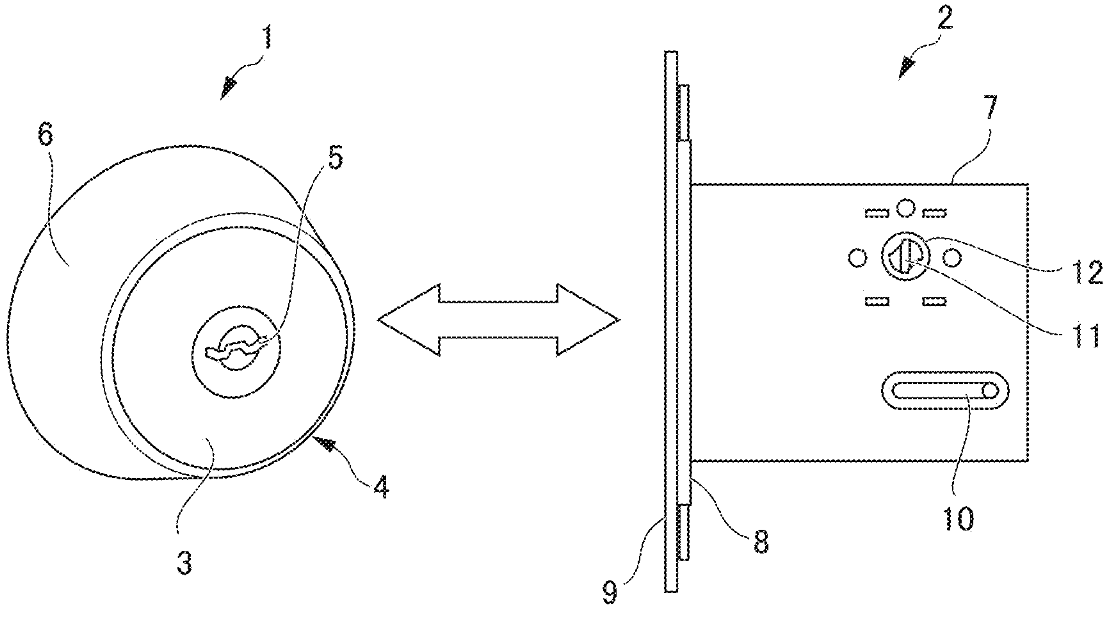
FIG. 1 is a conceptual diagram illustrating a correspondence relationship between a cylinder lock and a mortise lock, according to some embodiments.

FIG. 1 is a conceptual diagram illustrating a correspondence relationship between a cylinder lock that is attached to, for example, a door and a mortise lock provided inside a door end of the door, according to some embodiments of the present disclosure. FIG. 1 illustrates the cylinder lock 1 in a left portion and the mortise lock 2 to which the cylinder lock 1 is applied in a right portion. The cylinder lock 1 in FIG. 1 includes a cylinder lock body 3 and a key insertion portion 5 that is provided at a front end 4 of the cylinder lock body 3. A key that fits into the cylinder lock 1 is inserted from the key insertion portion 5. An annular cylinder cover 6 is provided to surround the front end 4 of the cylinder lock body 3.

The mortise lock 2 includes a lock case 7, a left side surface of which is illustrated. The lock case 7 has, at its front side (left side in FIG. 1), a front backing 8 and a front plate 9 superimposed on the front backing 8. The lock case 7 has, in a lower rear portion of the left side surface, a guide hole 10 for guiding a guide pin of a dead bolt (not shown) in an advancing-retracting direction (left-right direction in FIG. 1).

On the left side surface of the lock case 7, a dead bolt-drive member 12, which is also commonly called "Dharma" in the Japanese language, is provided above the guide hole 10. The drive member 12 has a fitting hole 11 in which a plate-shaped tail piece, which is a displacement transmission member to be described later, of the cylinder lock body 3 is fitted. The drive member 12 includes, as a main part thereof, a plate-like member having a shape according to the specifications, such as a modified sector shape. In FIG. 1, only the head of a circular column-shaped portion of the drive member 12 slightly protruding from the hole formed in the lock case 7 is visually recognized. The drive member 12 can be rotationally displaced due to rotation of the tail piece fitted in the fitting hole 11, and this rotational displacement causes the dead bolt to move in the advancing-retracting direction via a predetermined displacement transmission mechanism. When the dead bolt is in an advanced position, the mortise lock 2 is in a locked state, whereas when the dead bolt is in a retracted position, the mortise lock 2 is in an unlocked state. In general, a cylinder lock is applicable to a mortise lock that is disposed inside, for example, a door end, and the specifications of the cylinder lock and the specifications of the mortise lock are in a one-to-one correspondence relationship. In contrast, the cylinder lock 1 (more specifically, the cylinder lock body 3) of the present disclosure can be used in combination with mortise locks having a plurality of types of predetermined specifications, by way of selective application of appropriate tail pieces.

FIGS. 2 to 13 are diagrams each illustrating a state in which the cylinder lock body 3 of the cylinder lock 1 of the present disclosure has a tail piece as a displacement transmission member 13 and a cylinder cover 6 attached thereto. The displacement transmission member 13 is selected from displacement transmission members respectively corresponding to mortise locks having a plurality of types of predetermined specifications, and the cylinder cover 6 is also selected from cylinder covers having a plurality of types of predetermined specifications. The cylinder lock body 3 includes, at a key rear end portion 16 thereof, a displacement transmission member mounting portion 310 on which the tail piece is selectively mounted. The cylinder lock body 3 further includes, on its side with the key insertion portion 5, a cylinder cover mounting portion 320 on which the cylinder cover 6 is selectively mounted. Each of FIGS. 2 to 13 illustrates a case where one tail piece 13 selected from tail pieces of four types tentatively denoted as "a" to "d", i.e., tail pieces 13*a* to 13*d*, and one cylinder cover 6 selected from cylinder covers of three types tentatively denoted as "a" to "c", i.e., cylinder covers 6*a* to 6*c* are applied to the same cylinder lock body 3. Each tail piece 13 includes a plate-shaped driving part 14 and a connecting part 15 integrated with the driving part 14. The connecting part 15 of the tail piece 13 is attached to the key rear end portion 16 constituting a rear end portion of the cylinder lock body. The key rear end portion 16 has the displacement transmission member mounting portion 310 formed as a planar portion, a slit, etc. for attaching of the connecting part 15 of the tail piece 13.

Figure 2:
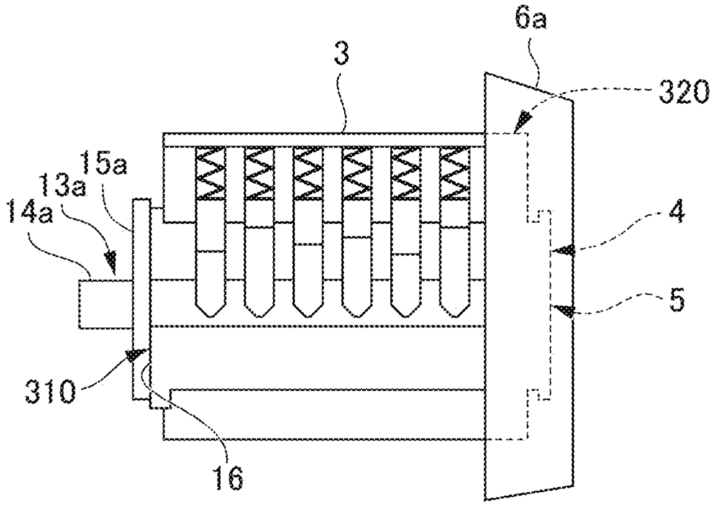
FIG. 2 is a diagram illustrating a combination of a cylinder lock, a tail piece, and a cylinder cover, according to some embodiments.

In the example illustrated in FIG. 2, the tail piece 13*a* of type "a" and the cylinder cover 6*a* of type "a" are applied to the cylinder lock body 3. The tail piece 13*a* is mounted on the key rear end portion 16 provided at the rear end opposite to the key insertion portion 5 at the front end 4 of the cylinder lock body 3. Specifically, the connecting part 15*a* of the tail piece 13*a* is detachably connected to the key rear end portion 16. Thus, when the cylinder lock 1 is unlocked with a passkey and the cylinder lock body 3 (an inner cylinder to be described later) is rotationally operated, the rotational displacement is transmitted to the drive member 12 of the corresponding mortise lock 2 via the driving part 14*a* of the tail piece 13*a*. The driving part 14*a* of the tail piece 13*a* of type "a" has a standard width and axial length. Thus, the tail piece 13*a* is suitably applicable to most standard mortise locks.

Figure 3:
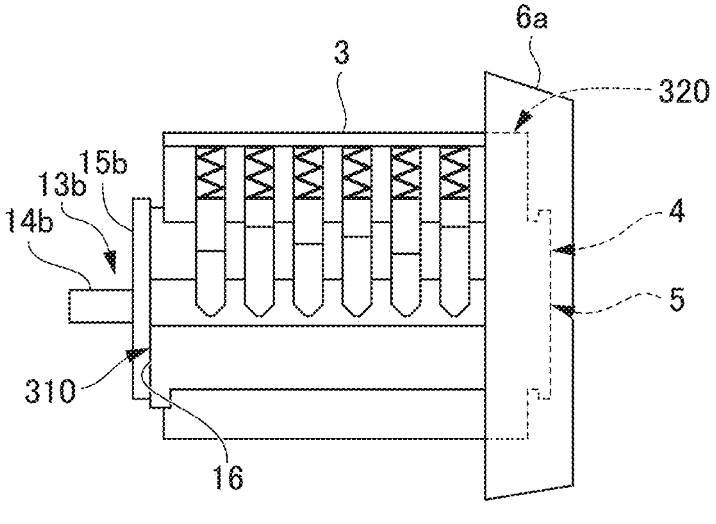
FIG. 3 is a diagram illustrating a combination of a cylinder lock, a tail piece, and a cylinder cover, according to some embodiments.

In the example illustrated in FIG. 3, the tail piece 13*b* of type "b" is applied to the cylinder lock body 3, in place of the tail piece 13*a* of type "a" of the example of FIG. 2. On the other hand, the same cylinder cover as that in FIG. 2, i.e., the cylinder cover 6*a* is applied. While the cylinder lock body of the example of FIG. 3 operates in the same manner as the example of FIG. 2, the driving part 14*a* of the tail piece 13*b* of type "b" is smaller in width and larger in axial length than the driving part of the tail piece 13*a* of type "a". Therefore, the tail piece 13*b* is suitably applicable to a mortise lock of a type that is provided in a door end of a door with a large thickness and that has a relatively small operational torque.

Figure 4:
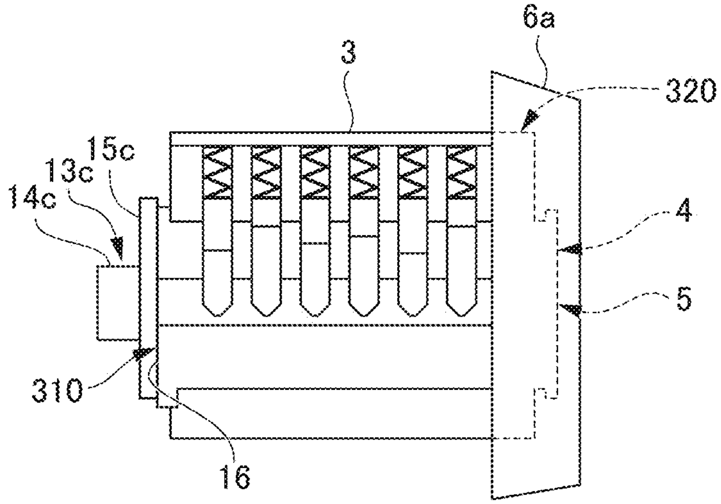
FIG. 4 is a diagram illustrating a combination of a cylinder lock, a tail piece, and a cylinder cover, according to some embodiments.

In the example illustrated in FIG. 4, the tail piece 13*c* of type "c" is applied to the cylinder lock body 3, in place of the tail piece 13*a* of type "a" of the example of FIG. 2. On the other hand, the same cylinder cover as that in FIG. 2, i.e., the cylinder cover 6*a* is applied. While the cylinder lock body of the example of FIG. 4 operates in the same manner as the example of FIG. 2, the driving part 14*c* of the tail piece 13*c* of type "c" is larger in width and axial length than the driving part of the tail piece 13*a* of type "a". Therefore, the tail piece 13*c* is suitably applicable to a mortise lock of a type that is provided in a door end of a door with a small thickness and that has a relatively large operational torque.

Figure 5:
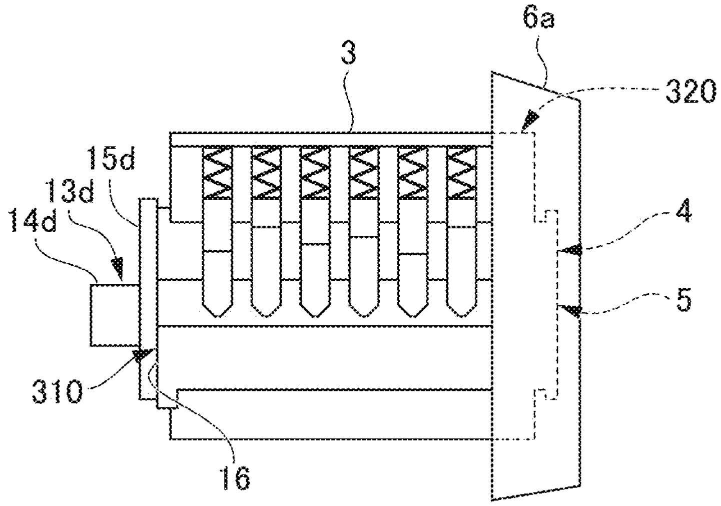
FIG. 5 is a diagram illustrating a combination of a cylinder lock, a tail piece, and a cylinder cover according to another example of the present disclosure.
Figure 6:
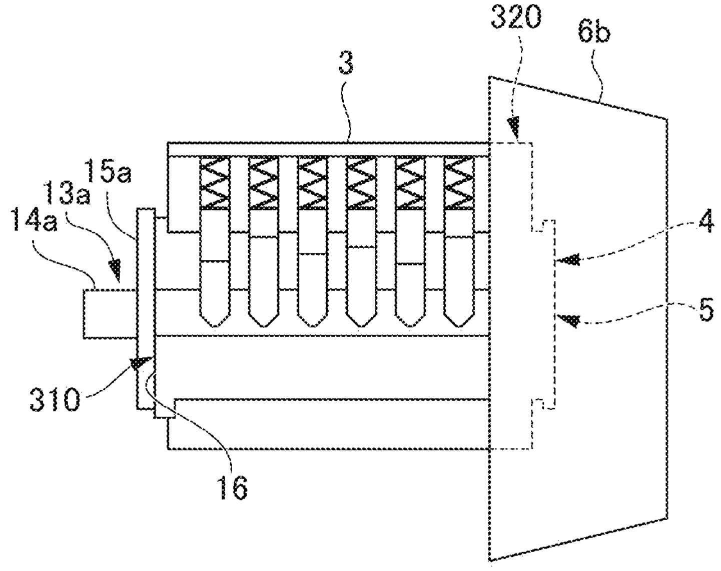
FIG. 6 is a diagram illustrating a combination of a cylinder lock, a tail piece, and a cylinder cover, according to some embodiments.
Figure 7:
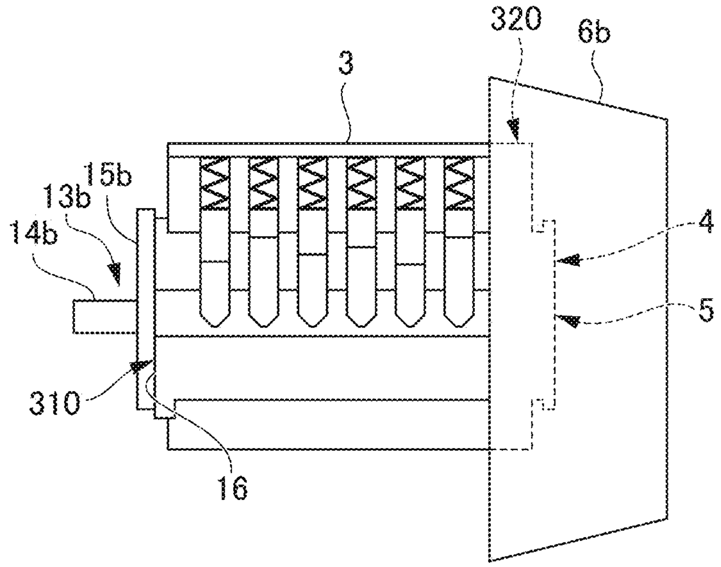
FIG. 7 is a diagram illustrating a combination of a cylinder lock, a tail piece, and a cylinder cover, according to some embodiments.
Figure 8:
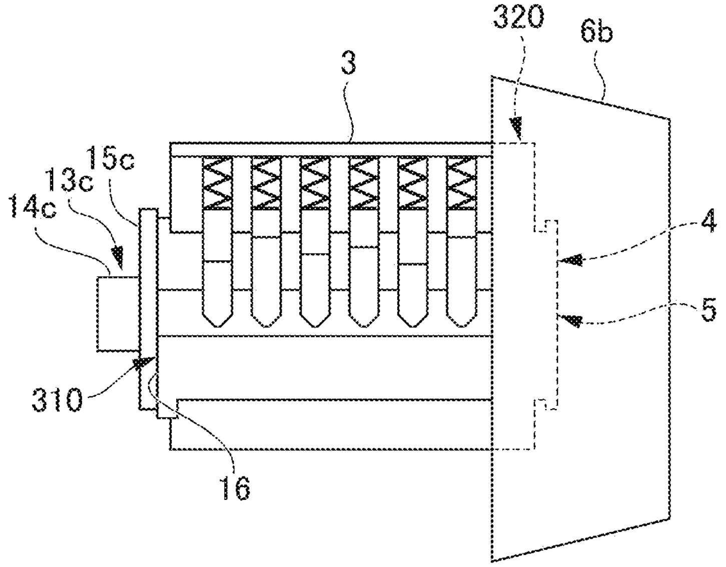
FIG. 8 is a diagram illustrating a combination of a cylinder lock, a tail piece, and a cylinder cover, according to some embodiments.
Figure 9:
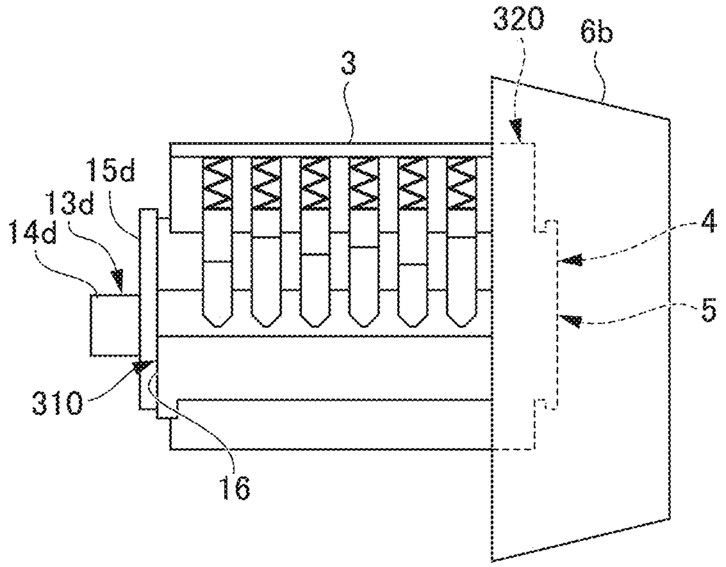
FIG. 9 is a diagram illustrating a combination of a cylinder lock, a tail piece, and a cylinder cover, according to some embodiments.
Figure 10:
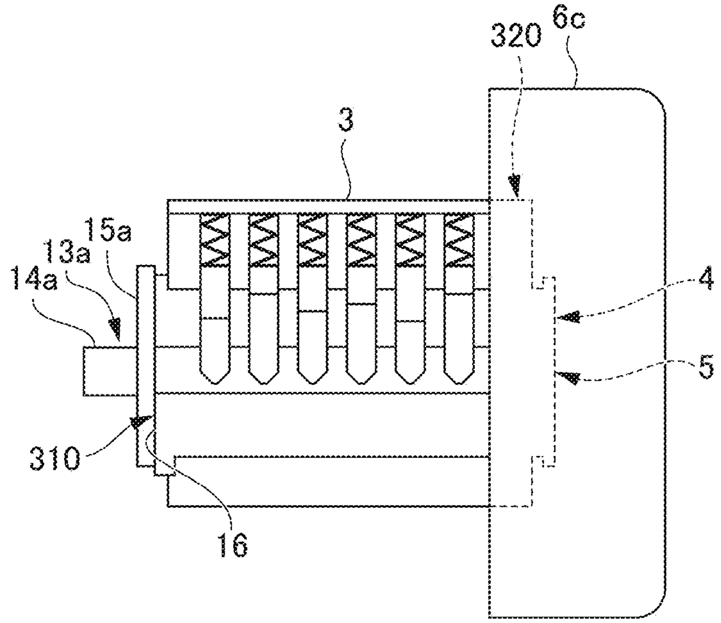
FIG. 10 is a diagram illustrating a combination of a cylinder lock, a tail piece, and a cylinder cover, according to some embodiments.
Figure 11:
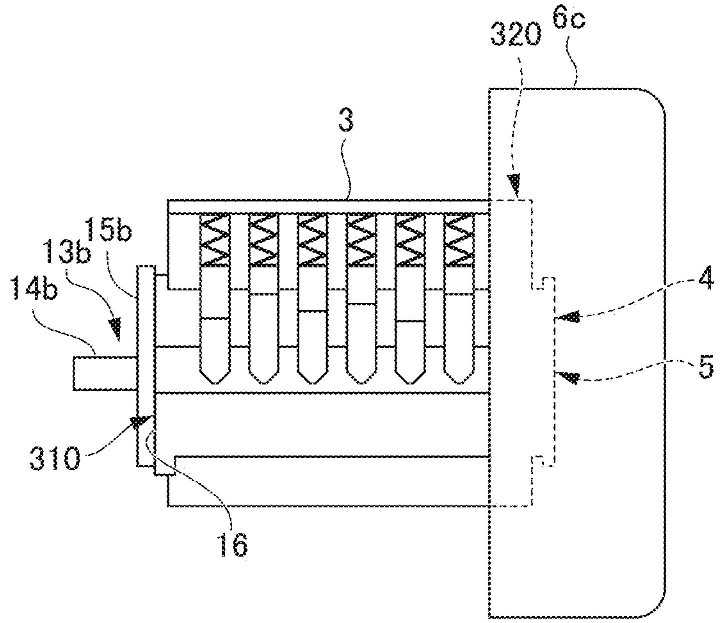
FIG. 11 is a diagram illustrating a combination of a cylinder lock, a tail piece, and a cylinder, according to some embodiments.
Figure 12:
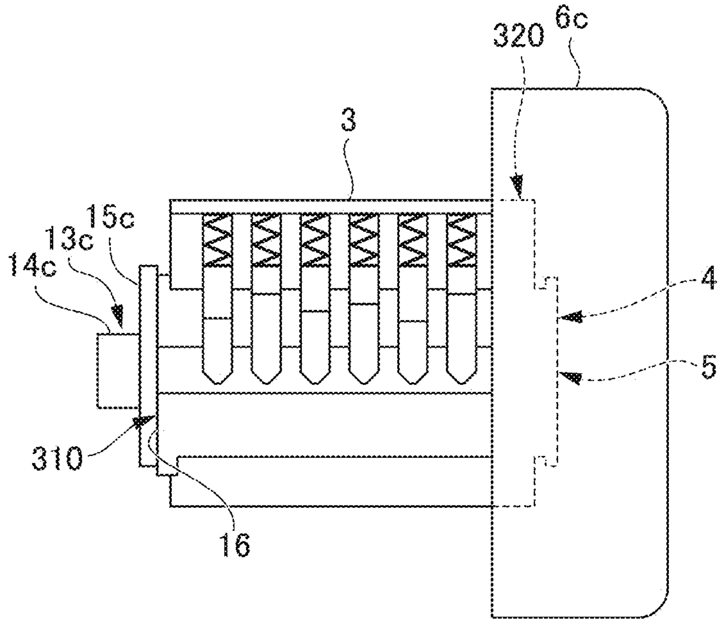
FIG. 12 is a diagram illustrating a combination of a cylinder lock, a tail piece, and a cylinder cover, according to some embodiments.
Figure 13:
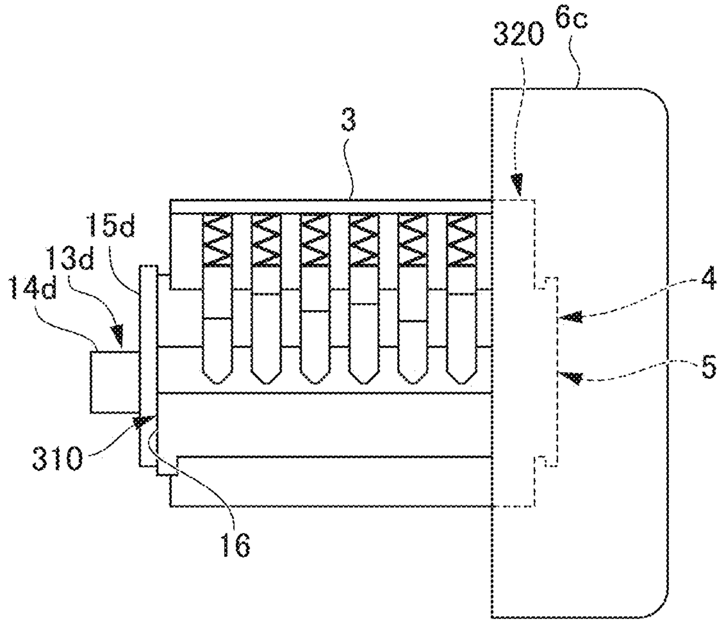
FIG. 13 is a diagram illustrating a combination of a cylinder lock, a tail piece, and a cylinder cover, according to some embodiments.

In the example illustrated in FIG. 5, the tail piece 13*d* of type "d" is applied to the cylinder lock body 3, in place of the tail piece 13*a* of type "a" of the example of FIG. 2. On the other hand, the same cylinder cover as that in FIG. 2, i.e., the cylinder cover 6*a* is applied. While the cylinder lock body of the example of FIG. 5 operates in the same manner as the example of FIG. 2, the driving part 14*d* of the tail piece 13*d* of type "d" is larger in width and smaller in axial length than the driving part of the tail piece 13*a* of type "a". However, the axial length of the driving part 14*d* is longer than that in the example of FIG. 4. Therefore, the tail piece 13*d* is suitably applicable to a mortise lock of a type that is provided in a door end of a door having a relatively small thickness while being thicker than a door to which the example of FIG. 4 is applicable, and that has a relatively large operational torque.

As described above, in each of the four examples illustrated in FIGS. 2 to 5, one of the tail pieces 13 of the four types "a" to "d" (13*a* to 13*d*) is selectively applied, while the same cylinder cover 6*a* is applied. Accordingly, the examples of FIGS. 2 to 5 meet requirements related to the thicknesses of the doors and the operational torques of the mortise locks, and well agree with cases in which the cylinder cover 6*a* of type "a" is suitable from the viewpoint of design such as the appearance of the door and the harmonization with the surroundings including the door.

Next, reference is made FIGS. 6 to 9. In these four examples, one tail piece 13 selected from tail pieces of the four types "a" to "d" (13*a* to 13*d*) is applied, similarly to the examples of FIGS. 2 to 5, while the same cylinder cover 6*b* is applied. Accordingly, similarly to the examples of FIGS. 2 to 5, the examples of FIGS. 6 to 9 meet requirements related to the thicknesses of doors and the operational torques of the mortise locks, and well agree with cases in which the cylinder cover 6*b* of type "b" is suitable from the viewpoint of design such as the appearance of the door and the harmonization with the surroundings including the door.

Referring to FIGS. 10 to 13, in these four examples, one tail piece 13 selected from tail pieces of the four types "a" to "d" (13*a* to 13*d*) is applied, similarly to the examples of FIGS. 2 to 5, while the same cylinder cover 6*c* is applied. Accordingly, similarly to the examples of FIGS. 2 to 5, the examples of FIGS. 10 to 12 meet requirements related to the thicknesses of doors and the operational torques of the mortise lock, and well agree with cases in which the cylinder cover 6*c* of type "c" is suitable from the viewpoint of design such as the appearance of the door and the harmonization with the surroundings including the door.

Figure 14:
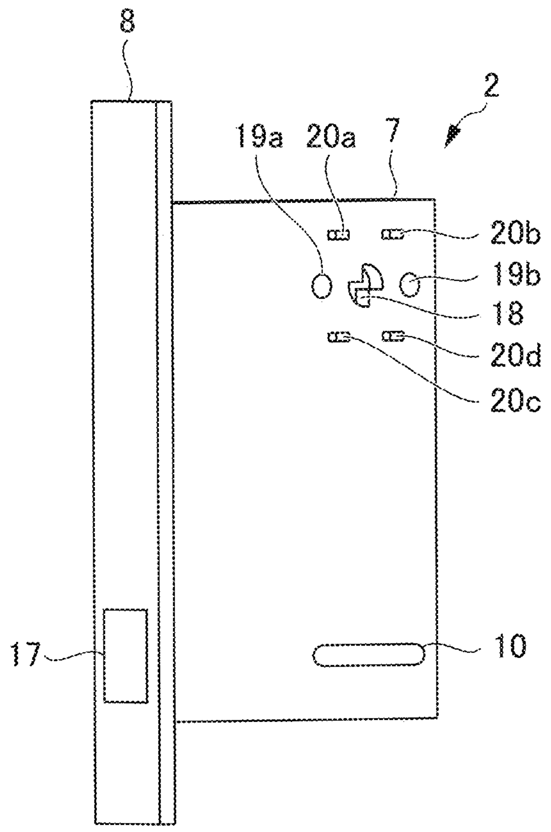
FIG. 14 is a perspective view of a side of a mortise lock that corresponds to a cylinder lock, according to some embodiments.

FIG. 14 is a side perspective view of a mortise lock that corresponds to the cylinder lock 1 of the present disclosure. In FIG. 14, components equivalent to those illustrated in FIG. 1 are denoted by the same reference signs. A lock case 7 of the mortise lock 2 has a front backing 8 integrated with a front face (where the dead bolt protrudes) of the lock case 7. A dead bolt advancing/retracting hole 17 is formed in a lower portion of the front backing 8. A guide pin of the dead bolt (not shown) is guided in a guide hole 10, whereby the dead bolt is advanced and retracted. In the example of FIG. 14, a dead bolt-drive member, which is also commonly called "Dharma" in the Japanese language, is entirely disposed inside the lock case 7.

Although the drive member disposed inside the lock case 7 is not seen from the viewpoint for FIG. 14, for the sake of convenience of description, the drive member is assigned with the reference sign 12*a*, and is hereinafter referred to as the drive member 12*a*. An insertion hole 18 is formed in a rear upper portion of the side surface of the lock case 7. The insertion hole 18 is to allow the driving part 14 of the tail piece 13 mounted to the cylinder lock body 3 to be inserted into the lock case 7. The driving part 14 inserted into the lock case 7 through the insertion hole 18 is fitted into a fitting hole formed in the drive member 12*a*. Due to this configuration, a rotation of the tail piece 13 is transmitted to the drive member 12*a*, and the dead bolt is advanced or retracted via a predetermined displacement transmission mechanism. When the dead bolt reaches an advanced position, the mortise lock 2 is brought into a locked state, and when the dead bolt is retracted, the mortise lock 2 is brought into an unlocked state.

In the example of FIG. 14, the insertion hole 18 has a shape of two sectors that have a center angle of approximately 90 degrees and are continuous with each other at the common center such that one radius of one sector and the other radius of the other sector are linearly aligned. Thus, when the plate-shaped driving part 14 of the tail piece 13 is inserted into the insertion hole 18 while positioned along the two corresponding linearly-aligned radii of the two sectors, the driving part 14 is allowed to rotate by approximately 90 degrees. When the insertion hole 18 is viewed from front, two bolt holes 19*a* and 19*b* are formed at left and right positions symmetrical with respect to the center of the two sectors. In addition, two engagement holes 20*a* and 20*b* are formed at positions aligned in the left-right direction above the bolt holes 19*a* in the front view, and likewise, two engagement holes 20*c* and 20*d* are formed at positions aligned in the left-right direction below the bolt hole 19*a* in the front view.

Figure 15:
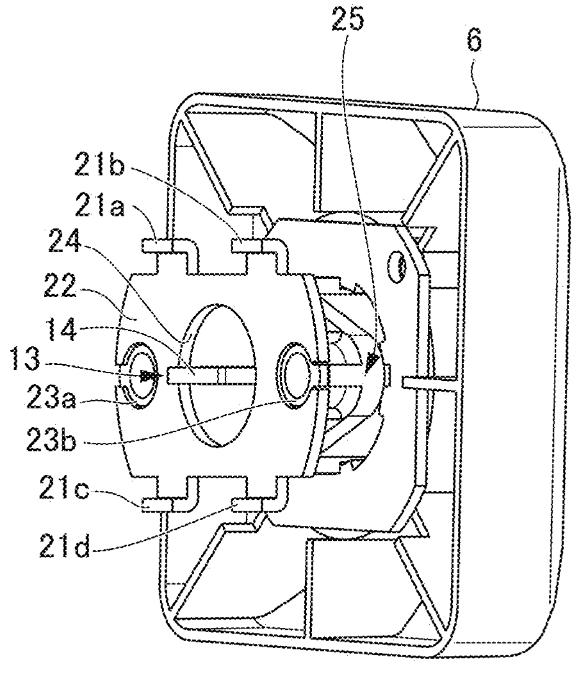
FIG. 15 is a perspective view of a cylinder lock as viewed from the rear, according to some embodiments.

FIG. 15 is a perspective view of the cylinder lock 1 according to an example of the present disclosure, as viewed from the rear. A retainer plate 22 is disposed adjacent to the rear end of the cylinder lock body 3. The retainer plate 22 is provided with engagement claws 21*a*, 21*b*, 21*c*, and 21*d* that are engageable with the engagement hole 20*a*, 20*b*, 20*c*, and 20*d* illustrated in FIG. 14 described above, in this order. The retainer plate 22 has bolt insertion holes 23*a* and 23*b* that correspond to the bolt holes 19*a* and 19*b* of the lock case 7 illustrated in FIG. 14, in this order. An insertion hole 24 through which the driving part 14 of the tail piece 13 is inserted is formed at the center of the retainer plate 22. Note that in FIG. 15, the cylinder lock body 3 is coaxially accommodated in a cylindrical member 25 for mounting the cylinder lock body 3, and is not directly visually recognized.

Figure 16:
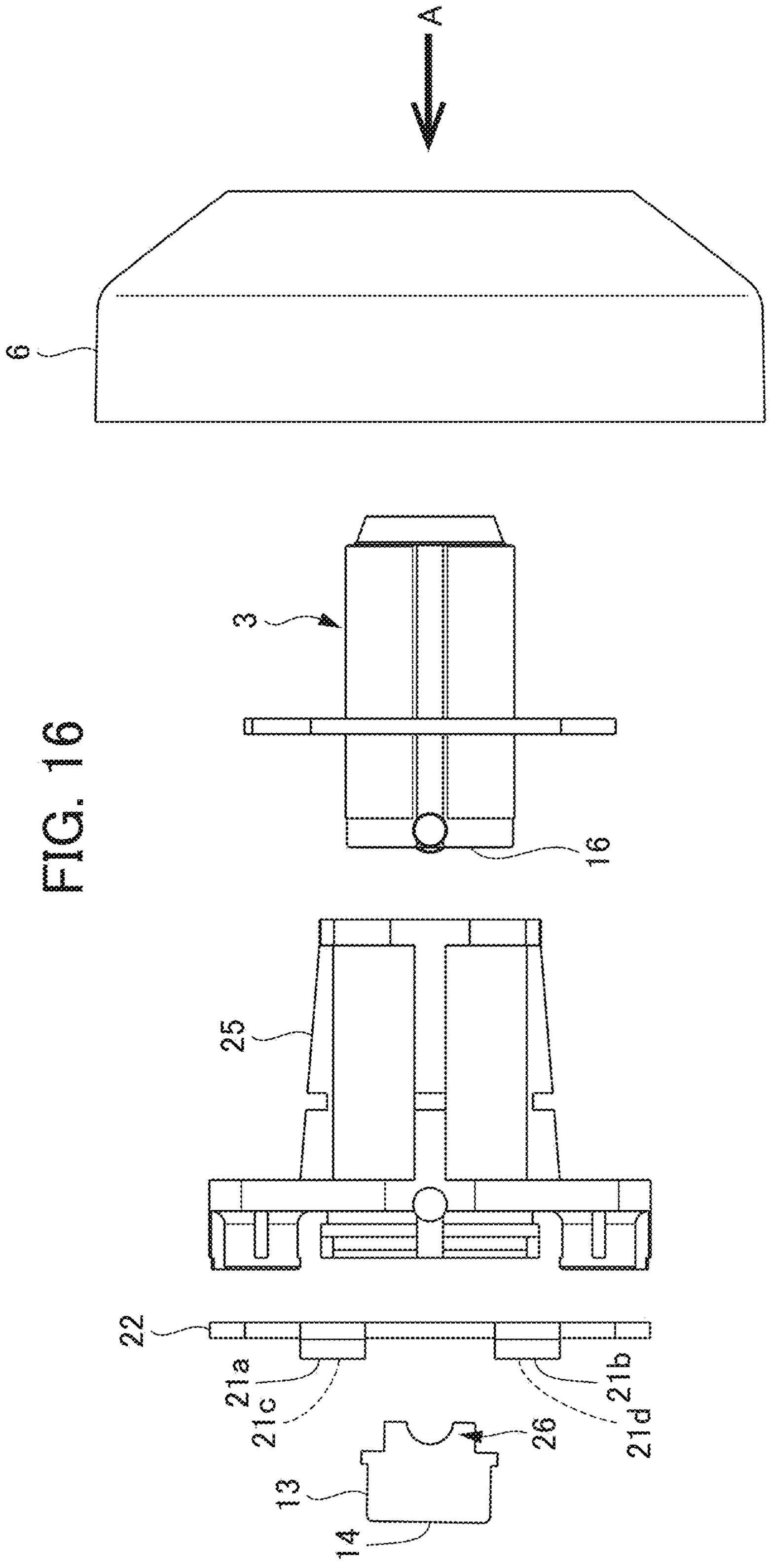
FIG. 16 is an exploded view of a cylinder lock, according to some embodiments.

FIG. 16 is an exploded view of the cylinder lock 1 according to an example of the present disclosure. FIG. 16 illustrates the cylinder lock 1 as viewed from above. In FIG. 16, components corresponding to those illustrated in FIG. 15 described above are denoted by the same reference signs. The arrow A indicates the direction in which a key (passkey) is inserted. In some embodiments, the tail piece 13 is connected to the key rear end portion 16 of the cylinder lock body 3 by means of a plate-shaped connecting portion 26 of the connecting part 15 of the tail piece 13 illustrated in each of FIGS. 2 to 13. This connection can be implemented by, for example, securely fitting the plate-shaped connecting portion 26 into a slit formed in the key rear end portion 16.

The cylinder lock of the present disclosure can be adapted to a desired mortise lock 2 by way of selective use of one tail piece as the displacement transmission member from among tail pieces respectively corresponding to mortise locks having a plurality of types of predetermined specifications. On the other hand, the cylinder lock per se can have various specifications. Next, various examples of the cylinder lock body of the present disclosure will be described.

FIGS. 17 to 20 illustrate various examples of the cylinder lock body of the present disclosure. In FIGS. 17 to 20, an identical integer as a reference sign is associated with the same kind of component/portion, and is followed by an alphabetic character for distinguishment between the examples. For the sake of convenience of description, features common to the examples illustrated in FIGS. 17 to 20 will be described with reference to the integers of the reference signs.

In FIGS. 17 to 20, the cylinder lock body 3 includes an outer cylinder 27 that is stationary and an inner cylinder 28 that is provided coaxially in the outer cylinder 27 and is allowed to rotate relative to the outer cylinder 27 when the cylinder lock is unlocked. A keyhole 29 continuous with a key insertion portion 5 extends along the central axis of the inner cylinder 28. The outer cylinder 27 has outer cylinder pin holes 30 and the inner cylinder 28 has inner cylinder pin holes 31. The outer cylinder pin holes 30 and the inner cylinder pin holes 31 are continuous in a radial direction from a virtual central axis common to the outer cylinder 27 and the inner cylinder 28. The outer cylinder pin holes 30 and the inner cylinder pin holes 31 have substantially the same diameter, and in the locked state, each of the outer cylinder pin holes 30 and an associated one of the inner cylinder pin holes 31 become coaxially continuous with each other to form a through hole 32. In the outer cylinder pin holes 30, urging springs 33 are disposed adjacent to the outer periphery of the outer cylinder 27. Further, in the outer cylinder pin holes 30, counter pins 34 are disposed adjacent to the inner periphery of the outer cylinder 27 such that the counter pins 34 are slidable in the outer cylinder pin holes 30. Tumblers 35 are slidably disposed in the inner cylinder pin holes 31. A key (passkey) 36 is inserted into the keyhole 29. The key 36 of the present disclosure is common to all the cylinder lock bodies 3 (3*a*, 3*b*, 3*c*, and 3*d*) having configurations illustrated in FIGS. 17 to 20. In other words, the keyholes 29 conform with the common key 36. The key 36 has a configuration in which a blade 38 having a predetermined shape extends from an end of a bow 37. Key cords (not shown) in the form of notches and dimples of various sizes are formed in the blade 38.

The cylinder lock bodies 3 (3*a*, 3*b*, 3*c*, and 3*d*) illustrated in FIGS. 17 to 20 have different numbers of tumblers 35 (35*a*, 35*b*, 35*c*, and 35*d*). That is, the number of the outer cylinder pin holes 30 (30*a*, 30*b*, 30*c*, and 30*d*), the number of the inner cylinder pin holes 31 (31*a*, 31*b*, 31*c*, and 31*d*), and the number of the counter pins 34 (34*a*, 34*b*, 34*c*, and 34*d*) differ depending on the number of the tumblers 35 (35*a*, 35*b*, 35*c*, and 35*d*). Accordingly, the cylinder lock bodies 3 (3*a*, 3*b*, 3*c*, and 3*d*) illustrated in FIGS. 17 to 20 have different axial dimensions. Therefore, by selectively applying the cylinder lock bodies 3 (3*a*, 3*b*, 3*c*, and 3*d*) illustrated in FIGS. 17 to 20, mortise locks agreeing with various doors having different thicknesses can be constructed.

Figure 17:
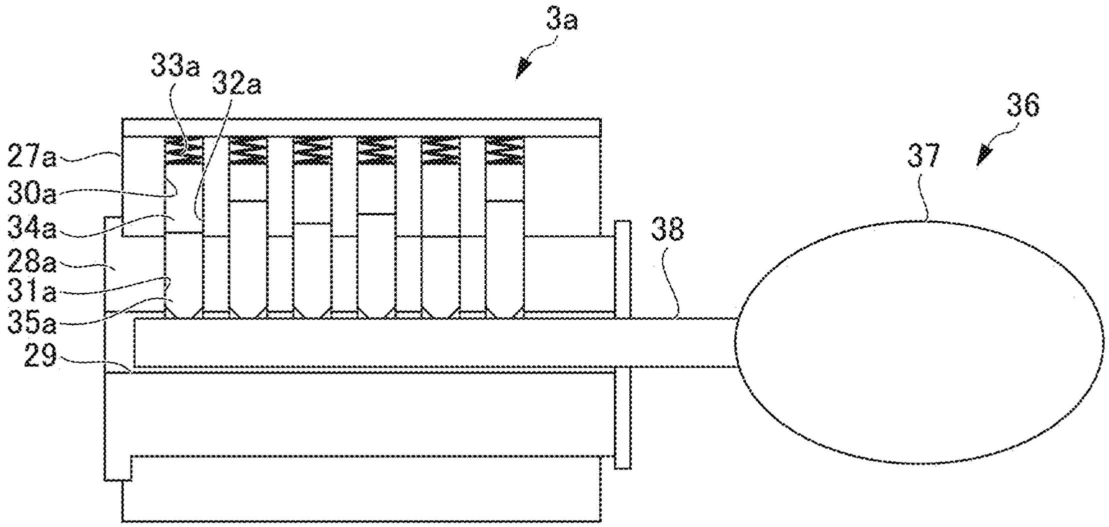
FIG. 17 is a diagram illustrating an example of a cylinder lock body, according to some embodiments.

Specifically, the cylinder lock body 3*a* illustrated in FIG. 17 includes six tumblers 35*a* (six outer cylinder pin holes 30*a* and six inner cylinder pin holes 31*a*) in the axial direction. The cylinder lock body 3*a* illustrated in FIG. 17 is suitable for use in a place where security requirements are relatively stringent, such as an entrance door.

Figure 18:
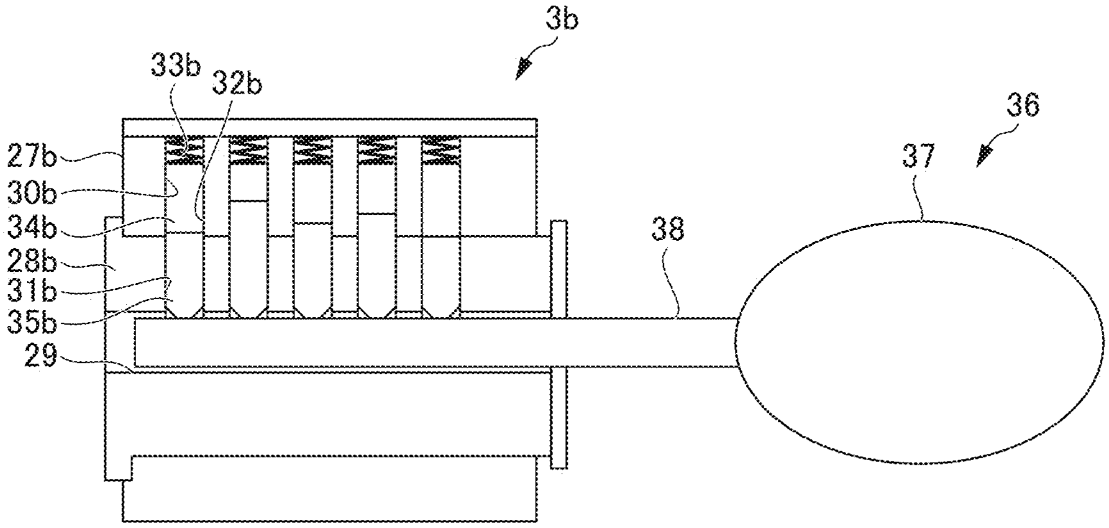
FIG. 18 is a diagram illustrating another example of the cylinder lock

The cylinder lock body 3*b* illustrated in FIG. 18 includes five tumblers 35*b* (five outer cylinder pin holes 30*b* and five inner cylinder pin holes 31*b*) in the axial direction. The cylinder lock body 3*b* illustrated in FIG. 18 is suitable for use in a place, such as a backdoor or a terrace door, that is second in security requirement stringency after the place to which the cylinder lock body of FIG. 17 is applied.

Figure 19:
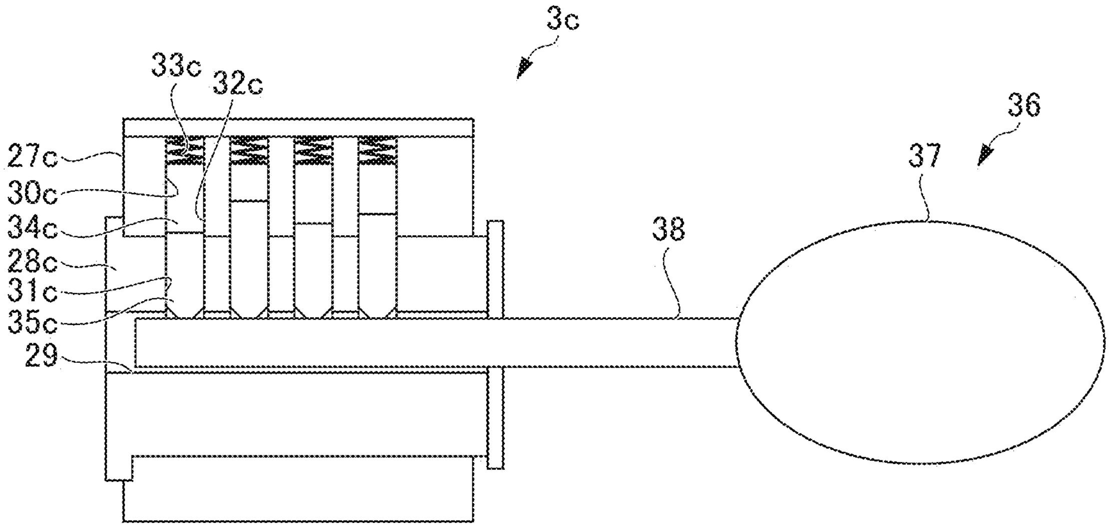
FIG. 19 is a diagram illustrating another example of the cylinder lock body, according to some embodiments.

The cylinder lock body 3*c* illustrated in FIG. 19 includes three tumblers 35*b* (three outer cylinder pin holes 30*c* and three inner cylinder pin holes 31*c*) in the axial direction. The cylinder lock body 3*c* illustrated in FIG. 19 is suitable for use in a place, such as a gate or an interior door, that is second in security requirement stringency after the place to which the cylinder lock body of FIG. 18 is applied.

Figure 20:
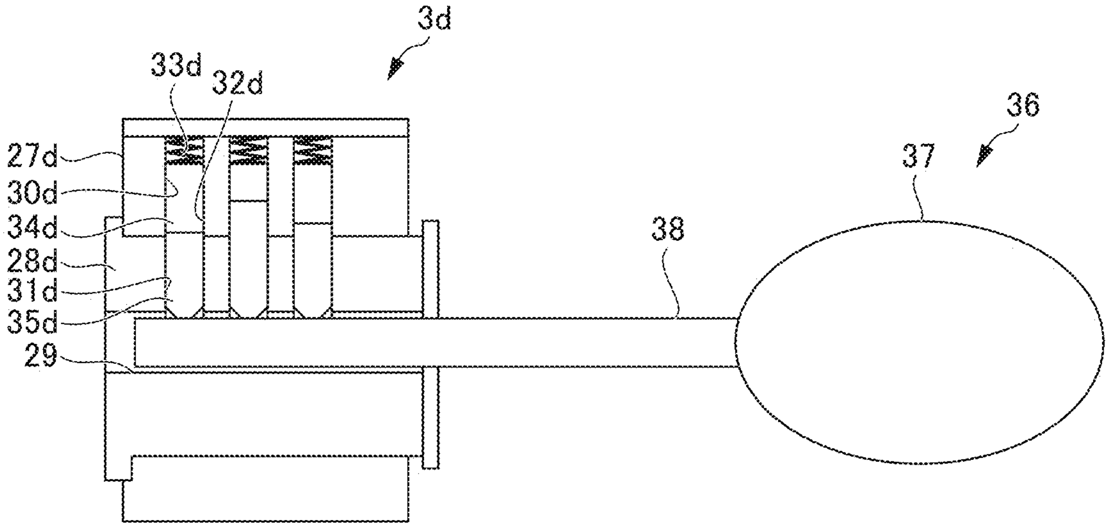
FIG. 20 is a diagram illustrating another example of the cylinder lock body, according to some embodiments.

The cylinder lock body 3*d* illustrated in FIG. 20 includes three tumblers 35*b* (three outer cylinder pin holes 30*d* and three inner cylinder pin holes 31*d*) in the axial direction. The cylinder lock body 3*d* illustrated in FIG. 20 is suitable for use in a place where security requirements are relatively not so stringent, such as a crescent lock for a small window or a delivery box.

As described above, the key 36 of the present disclosure is common to all the cylinder lock bodies 3 (3*a*, 3*b*, 3*c*, and 3*d*) having the configurations illustrated in FIGS. 17 to 20. This is because the tumblers 35*a*, 35*b*, 35*c*, and 35*d* of the cylinder lock bodies 3*a*, 3*b*, 3*c*, and 3*d*, which respectively have the configurations illustrated in FIGS. 17 to 20, are arranged so as to correspond to the same key codes in sections in which the tumblers 35*a*, 35*b*, 35*c*, and 35*d* are present, from a side adjacent to the inward end of the keyhole 29 (29*a*, 29*b*, 29*c*, and 29*d*) (a side adjacent to the tip of the key 36) toward a side adjacent to the key insertion portion 5 (a side adjacent to the bow 37 of the key 36).

As illustrated in FIG. 17, in the case of the cylinder lock body 3*a* of the type in which the six tumblers 35*a* are arranged in the axial direction, all the key codes in the longitudinal direction on the key 36 are effective and function to allow locking and unlocking operations. As illustrated in FIG. 18, in the case of the cylinder lock body 3*b* of the type in which the five tumblers 35*b* are arranged in the axial direction, among all the key codes in the longitudinal direction of the key 36, key codes that are provided in proximity to the tip and correspond to the section where the five tumblers 35*b* are present are effective and function to allow the locking and unlocking operations. Likewise, in the case of the cylinder lock body 3*c* illustrated in FIG. 19, among all the key codes in the longitudinal direction on the key 36, key codes that are provided in proximity to the tip and correspond to the section where the four tumblers 35*c* are present are effective and function. In the case of the cylinder lock body 3*d* illustrated in FIG. 20, among all the key codes in the longitudinal direction on the key 36, key codes that are provided in proximity to the tip and correspond to the section where the three tumblers 35*d* are present are effective and function. The rotational operations are allowed only when all contact portions between the tumblers 35 and the counter pins 34 are aligned along a share line as a virtual plane equivalent to the boundary between the outer cylinder 27 and the inner cylinder 28 due to match of the key codes formed on the blade 38 of the key 36 with all the corresponding tumblers.

It is conceivable to treat the plurality of cylinder lock bodies (3*a*, 3*b*, 3*c*, and 3*d*) in FIGS. 17 to 20 as a set. Specifically, the set of cylinder locks (FIGS. 17 to 20) includes the plurality of cylinder lock bodies (3*a*, 3*b*, 3*c*, and 3*d*), the cylinder locks have the same structure in proximity to the key rear end portion 16 but are different from each other in the axial length of the cylinder lock body 3, and the set of cylinder locks is provided with the keys 36 of the same type that agree with all the plurality of cylinder locks different in the axial length of the cylinder lock body 3.

Figure 21:
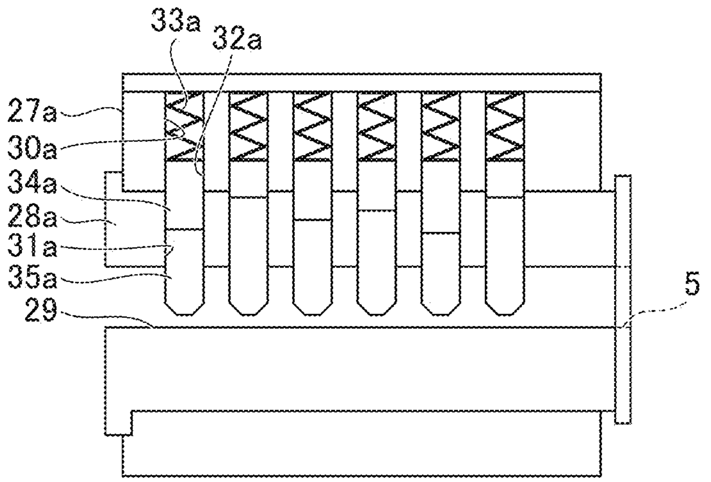
FIG. 21 is a longitudinal cross-sectional view illustrating an example of a cylinder lock body including a common platform, according to some embodiments.
Figure 22:
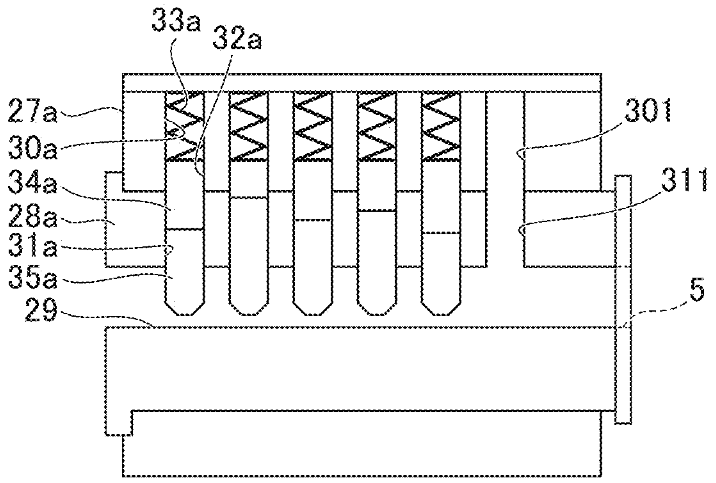
FIG. 22 is a longitudinal cross-sectional view illustrating another example of a cylinder lock body including the common platform, according to some embodiments.
Figure 23:
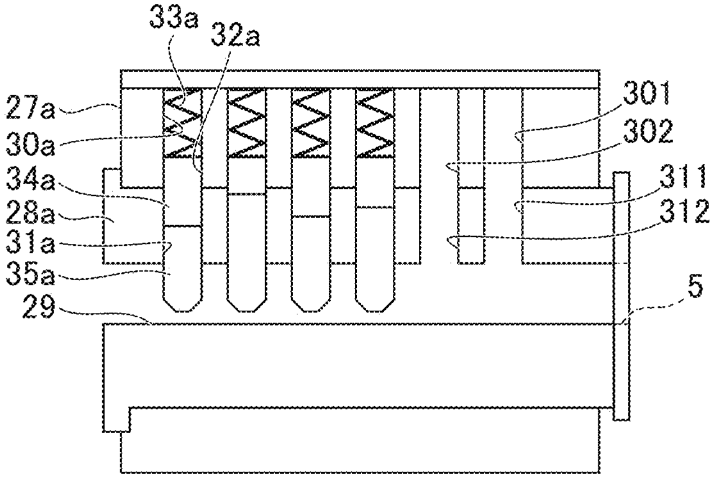
FIG. 23 is a longitudinal cross-sectional view illustrating another example of a cylinder lock body including the common platform, according to some embodiments.

FIGS. 21 to 23 are longitudinal cross-sectional views illustrating examples of cylinder lock bodies that include a common platform. FIG. 21 illustrates a cylinder lock body similar to that of FIG. 17, in more detail than in FIG. 17. In FIGS. 21 to 23, components corresponding to those in FIG. 17 are denoted by the same reference signs. In FIGS. 21 to 23, the common platform is constituted by an outer cylinder 27*a* and an inner cylinder 28*a*. The outer cylinder 27*a* has six outer cylinder pin holes 30*a* at predetermined intervals in the axial direction. The inner cylinder 28*a* has six inner cylinder pin holes 31*a* respectively corresponding to the outer cylinder pin holes 30*a*.

For the outer cylinder 27*a* and the inner cylinder 28*a*, which constitute the common platform of the cylinder lock body in FIG. 21, urging springs 33*a*, counter pins 34*a*, and tumblers 35*a* are disposed in all the six outer cylinder pin holes 30*a* and all the six inner cylinder pin holes 31*a*, thereby forming a high-level key in respect of which an extremely large number of keys with different shapes exist.

In the cylinder lock body illustrated in FIG. 22, among the six outer cylinder pin holes 30*a* of the outer cylinder 27*a* and the six inner cylinder pin holes 31*a* of the inner cylinder 28*a*, the outer cylinder pin hole 30*a* and the inner cylinder pin holes 31*a* that are close to the key insertion portion 5 are not provided with the urging spring 33*a*, the counter pin 34*a*, or the tumbler 35*a*, and are configured as an outer cylinder first blank hole 301 and an inner cylinder first blank hole 311. Therefore, the cylinder lock body of FIG. 22 is a middle-level key in respect of which a smaller number of keys with different shapes exist in comparison with the cylinder lock body of FIG. 21, and which is composed of less parts than the cylinder lock body of FIG. 21. The cylinder lock body illustrated in FIG. 22 is a so-called popular-priced product.

In the cylinder lock body illustrated in FIG. 23, in addition to the outer cylinder first blank hole 301 and the inner cylinder first blank hole 311 of the cylinder lock body illustrated in FIG. 22, the pin holes axially adjacent to the first and second blank holes 301 and 311 are configured as an outer cylinder second blank hole 302 and an inner cylinder second blank hole 312. Thus, the cylinder lock body of FIG. 23 is an inexpensive key in respect of which a further smaller number of keys with different shapes exist in comparison with the cylinder lock body of FIG. 22, and which is composed of further less parts than the cylinder lock body of FIG. 22. The cylinder lock body of FIG. 23 is a so-called inexpensive version.

The effects provided in some embodiments of the present disclosure described above are summarized as follows. Some embodiments of the present disclosure are directed to the cylinder lock 1 capable of locking and unlocking a mortise lock via the displacement transmission member 13. The cylinder lock 1 includes the cylinder lock body 3, the key insertion portion 5 that is disposed at one end of the cylinder lock body 3 and allows a key to be inserted therethrough, and the displacement transmission member mounting portion 310 that is disposed at the other end of the cylinder lock body 3 and is provided for allowing mounting of the displacement transmission member 13. The displacement transmission member mounting portion 310 allows each of a plurality of displacement transmission members 13 (13*a*, 13*b*, 13*c*, and 13*d*) to be detachably mounted thereon, the plurality of displacement transmission members 13 (13*a*, 13*b*, 13*c*, and 13*d*) respectively corresponding to mortise locks having a plurality of types of specifications.

In some embodiments, the same cylinder lock body 3 can be applied to each of the mortise locks 2 having the plurality of types of predetermined specifications by selectively mounting, on the key rear end portion 16, one of the plurality of displacement transmission members 13 (13*a*, 13*b*, 13*c*, and 13*d*) respectively corresponding to the mortise locks 2 having the plurality of types of predetermined specifications. Therefore, regardless of whether the door to which the mortise lock is attached is of a new building or a building to be reformed, the common cylinder lock bodies can be applied to various kinds of mortise locks. Furthermore, it is only necessary to have fresh common cylinder lock bodies 3 and a plurality of kinds of fresh displacement transmission members 13 in reserve, as parts for maintenance. In this case, if a distribution system for circulating the cylinder lock bodies 3 and the plurality of kinds of displacement transmission members 13 in sets is established, a construction company and the like having the sets in reserve can immediately respond to demands for cylinder lock replacement of various mortise locks by selecting an appropriate one from the displacement transmission members 13.

In some embodiments, the cylinder lock described above further includes a cylinder cover mounting portion 320 that is disposed at the one end of the cylinder lock body 3 and is provided for allowing mounting of the cylinder cover 6, and the cylinder cover mounting portion 320 allows each of a plurality of cylinder covers having a plurality of types of specifications to be detachably mounted thereon.

In some embodiments, a cylinder cover most suitable from the viewpoint of design, such as appearance of a door and harmonization with the surroundings including the door, can be applied to the cylinder lock described above.

In some embodiments, the cylinder lock further includes a keyhole that is continuous with the key insertion portion, and the keyhole is suitably applicable to each of a plurality of the cylinder locks that are different in an axial length of the cylinder lock body.

In some embodiments, a common key is applicable to the cylinder locks described above. Thus, the plurality of cylinder locks in which the cylinder lock bodies have different axial lengths can be locked and unlocked by one common key.

In some embodiments, a set of cylinder locks (FIGS. 17 to 20) includes a plurality of the cylinder locks according to any of the embodiments described above. Preferably, the plurality of the cylinder locks have an identical inner structure in proximity to the key rear end portion 16 while being different in an axial length of the cylinder lock body 3, and the set of cylinder locks include the keys 36 of an identical type that agree with all of the plurality of the cylinder locks different in the axial length of the cylinder lock body 3.

In some embodiments, having the set of cylinder locks (FIGS. 17 to 20) handy makes it possible to apply the cylinder locks to places of different uses, and all the cylinder bodies 3 of the set of the cylinder locks can be locked and unlocked with the keys 36 of the identical type. That is, it is possible to lock and unlock cylinder locks provided in different places with the keys 36 of the identical type.

The displacement transmission member for transmitting the displacement for locking and unlocking the mortise lock from the cylinder lock to the mortise lock is not limited to the tail piece, and may be embodied in various ways. For example, it is conceivable to employ a configuration in which rotation of the inner cylinder of the cylinder lock body is transmitted to the mortise lock by a displacement transmission mechanism including a belt and a pulley, or a configuration in which rotation of the inner cylinder is transmitted to the mortise lock via a gear.

The invention claimed is:

1. A cylinder lock configured to lock and unlock a plurality of mortise-locks via a plurality of tail pieces, the cylinder lock comprising:

a cylinder lock body;

a key insertion portion that is disposed at one end of the cylinder lock body and allows a key to be inserted therethrough;

the plurality of tail pieces, wherein each tail piece of the plurality of tail pieces is of a respective type of a plurality of types that respectively corresponds to a mortise lock of the plurality of mortise locks, wherein the plurality of mortise locks have a plurality of types of specifications; and a displacement transmission member mounting portion that is disposed at another end of the cylinder lock body and is provided for allowing mounting of one of the plurality of tail pieces, wherein each tail piece of the plurality of tail pieces of the plurality of types is detachably mountable on the displacement transmission member mounting portion.

2. The cylinder lock of claim 1, further comprising:

a cylinder cover mounting portion that is disposed at the one end of the cylinder lock body and is provided for allowing mounting of a cylinder cover, wherein the cylinder cover mounting portion allows each of a plurality of cylinder covers having a plurality of types of specifications to be detachably mounted thereon.

3. The cylinder lock of claim 1, further comprising:

a keyhole that is continuous with the key insertion portion, wherein the keyhole is suitably applicable to each of a plurality of the cylinder locks that are different in an axial length of the cylinder lock body.

4. A set of cylinder locks comprising a plurality of the cylinder locks of claim 1, wherein the plurality of the cylinder locks have an identical inner structure in proximity to the other end while being different in an axial length of the cylinder lock body, and wherein the set of cylinder locks include a key of an identical type that is suitably applicable to all of the plurality of the cylinder locks different in the axial length of the cylinder lock body.

5. The cylinder lock of claim 2, further comprising:

a keyhole that is continuous with the key insertion portion, wherein the keyhole agrees with each of a plurality of the cylinder locks that are different in an axial length of the cylinder lock body.

6. A set of cylinder locks comprising a plurality of the cylinder locks of claim 2, wherein the plurality of the cylinder locks have an identical inner structure in proximity to the other end while being different in an axial length of the cylinder lock body, and wherein the set of cylinder locks include a key of an identical type that agrees with all of the plurality of the cylinder locks different in the axial length of the cylinder lock body.

7. A set of cylinder locks comprising a plurality of the cylinder locks of claim 3, wherein the plurality of the cylinder locks have an identical inner structure in proximity to the other end while being different in an axial length of the cylinder lock body, and wherein the set of cylinder locks include a key of an identical type that agrees with all of the plurality of the cylinder locks different in the axial length of the cylinder lock body.

* * * * *